March 18, 1947.  C. K. STEINS ET AL  2,417,526
STABILIZING MECHANISM FOR RAIL AND OTHER WHEELED VEHICLES
Filed Sept. 29, 1944   3 Sheets-Sheet 1
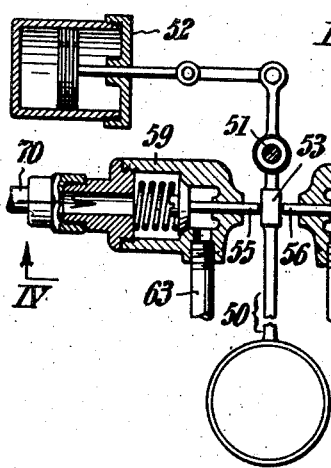
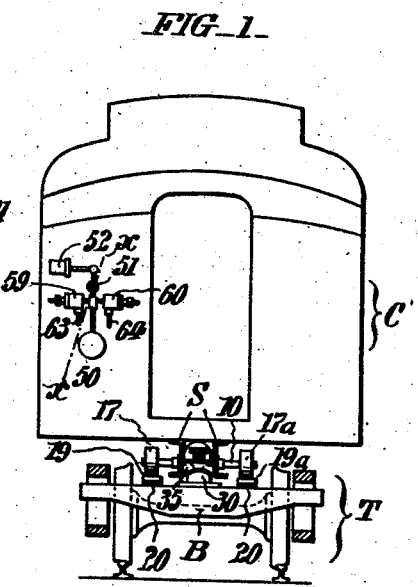
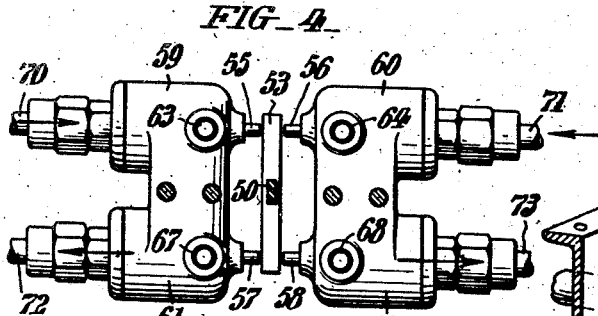
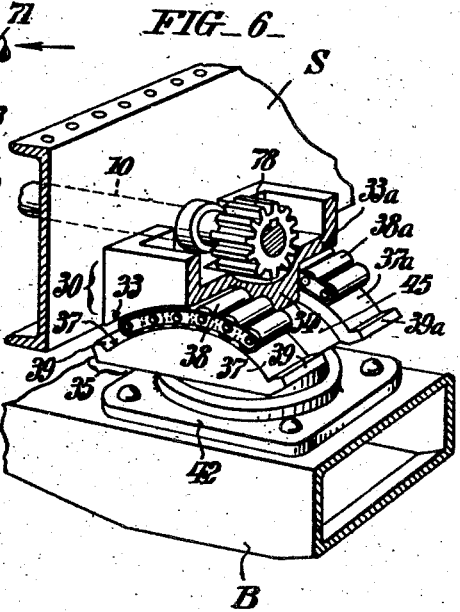
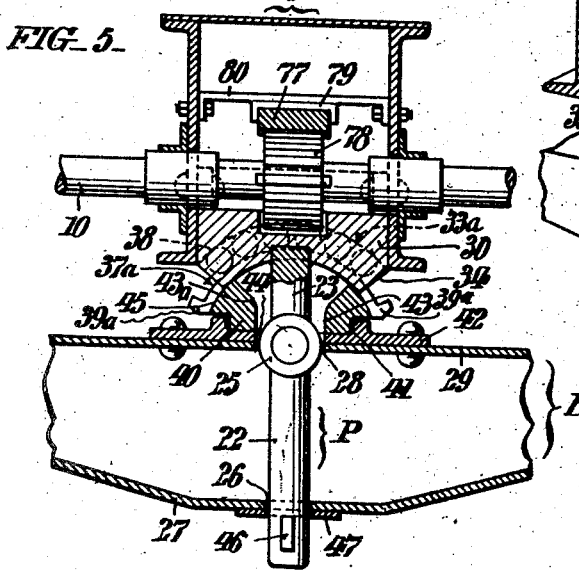
INVENTORS:
Carleton K. Steins &
William M. Keller,
BY
Paul & Paul
ATTORNEYS.

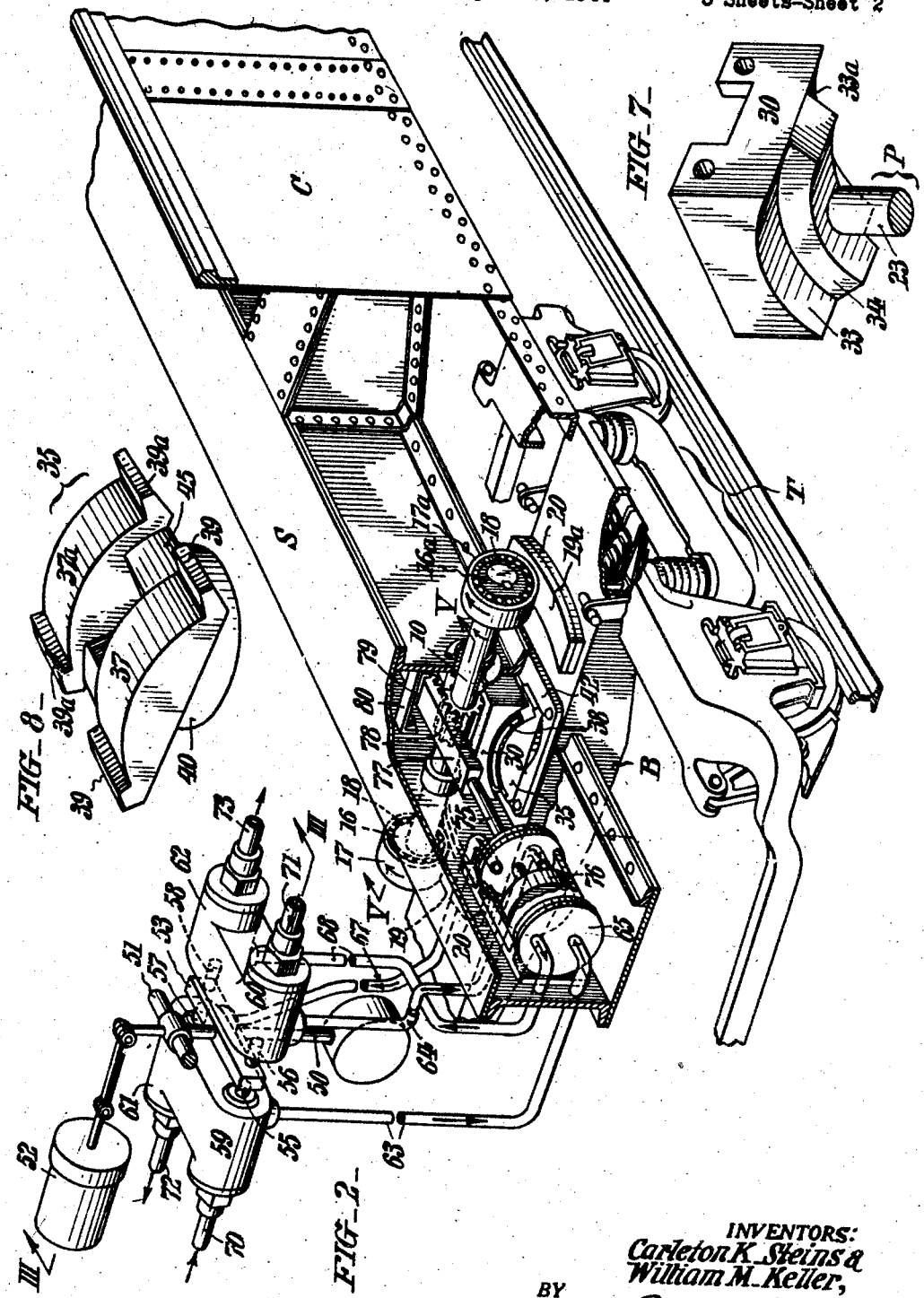

March 18, 1947.　　　C. K. STEINS ET AL　　　2,417,526
STABILIZING MECHANISM FOR RAIL AND OTHER WHEELED VEHICLES
Filed Sept. 29, 1944　　　3 Sheets-Sheet 3
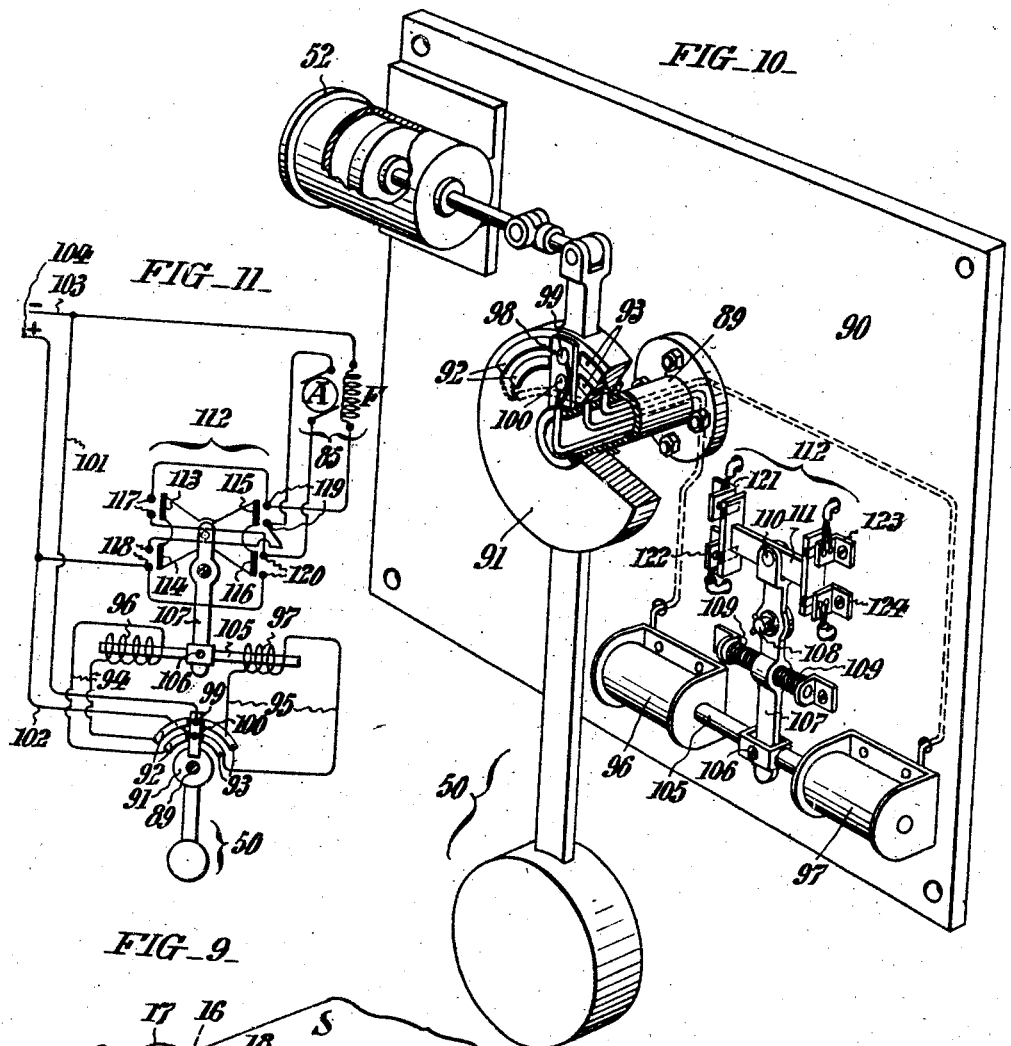
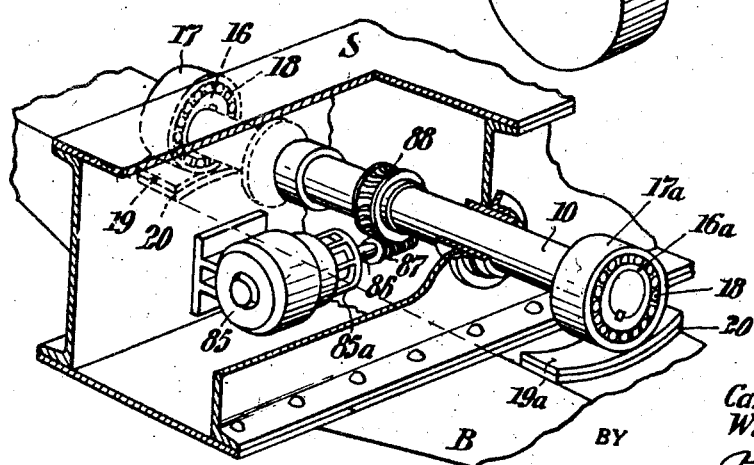
INVENTORS:
Carleton K. Steins &
William M. Keller,
BY Paul & Paul
ATTORNEYS.

Patented Mar. 18, 1947

2,417,526

UNITED STATES PATENT OFFICE 2,417,526

STABILIZING MECHANISM FOR RAIL AND OTHER WHEELED VEHICLES

Carleton K. Steins and William M. Keller, Merion, Pa., assignors to The Pennsylvania Railroad Company, Philadelphia, Pa., a corporation of Pennsylvania Application September 29, 1944, Serial No. 556,326

9 Claims. (Cl. 105—164)

This invention relates to mechanism for stabilizing rail cars and other wheeled vehicles.

The chief aim of our invention is to prevent the exertion of lateral forces on the occupants or contents of railway cars and the like incident to travel at high speeds around curves and also when the vehicles are left standing on superelevated or banked curves, with a view toward precluding jolting of and injury to passengers or displacement and possible damage to ladings under either of the conditions mentioned.

Another aim of our invention is to secure the foregoing desideratum in an automatic stabilizing mechanism which is simple and reliable in operation; and which can be readily incorporated in existent vehicles without requiring any major changes in their construction and without interfering with their normal behavior in other respects.

Other objects and attendant advantages will appear from the following description of the attached drawings, wherein Fig. 1 is a view partly in end elevation and partly in transverse section of a railway car conveniently embodying our improved stabilizing mechanism.

Fig. 2 is a fragmentary diagrammatic view in perspective with portions of the car body in section, showing the stabilizing mechanism, with its car cylinder operated body-tilting means and its control means.

Fig. 3 is a detail sectional view taken as indicated by the angled arrows III—III in Fig. 2 illustrating the control means of the mechanism.

Fig. 4 is a view of the control means looking as indicated by the angled arrows IV—IV in Fig. 3.

Fig. 5 is a detail sectional view taken as indicated by the angled arrows V—V in Fig. 2.

Fig. 6 is a fragmentary view corresponding to Fig. 2 drawn to a larger scale and showing certain details of the mechanism more clearly.

Figs. 7 and 8 are detail views in perspective of certain component parts of the mechanism.

Fig. 9 is a fragmentary perspective view corresponding to Fig. 2 and showing an alternative embodiment of our invention in which a reversible electric motor is utilized to operate the body-tilting means.

Fig. 10 is a perspective view of the pendulum-actuated switch means which we have provided for automatically controlling the electric motor; and Fig. 11 is a wiring diagram of the motor and its control switches.

With more detailed reference first more particularly to Figs. 1–8 of these drawings, it will be noted that the stabilizing mechanism there illustrated includes a transversely-arranged horizontal shaft 10 (see Figs. 1, 2, 5 and 6) which passes through the laterally-spaced side channels of the longitudinal center sill S at the bottom of the car body C, said shaft being rotative in bushed bearings suitably secured to the outer sides of said channels. Keyed to the opposite ends of the shaft 10 are eccentrics 16 and 16a, which, for a reason later on explained, are set one hundred and eighty degrees apart, and which are surrounded by sleeves 17 and 17a respectively with interposition in each instance of spherical anti-friction roller bearings 18. As shown in Figs. 1 and 2, the eccentric sleeves 17, 17a are adapted to roll upon flat arcuate wear plates 19 and 19a transversely arranged on the top of the bolster B of the car truck T which latter may, generally speaking, be of any approved design, said plates being concentric with the swivel axis of the truck. Interposed between each of the plates 19, 19a and the bolster B is a cushioning pad 20 of rubber or the like.

In accordance with our invention, the center pin P for the truck T is made in two parts which are respectively designated 22 and 23 in Fig. 5 and which are connected by a knuckle joint 25. As shown, the component 22 of the center pin P extends down through a bearing aperture 26 in the bottom web 27 of the truck bolster B, while the knuckle joint 25 fits rather snugly into an aperture 28 in the top web 29 of said bolster. The upper component 23 of the center pin P is either rigidly connected to or integrally formed with a member 30 in the form of a filler block which extends crosswise between the side channels of the center sill S at the bottom, and which is suitably secured to said channels as by riveting or bolting, or otherwise. The filler block 30 is separately illustrated in perspective in Fig. 7. As shown, it is of rectangular configuration in plan and has concaved arcuate bottom surfaces 33 and 33a which are struck from the axis of the knuckle joint 25 and which are disposed at opposite sides of a concentric medial arcuate tongue or rib 34 wherefrom the component 23 of the center pin P depends. In the assembly, the filler block 30 overlies a swivel member 35 in the form of a head which is separately illustrated in perspective in Fig. 8. As shown in Figs. 5 and 6, the block 30 has transversely-extending laterally-spaced convex arcuate rises 37 and 37a complemental to the arcuate surfaces 33 and 33a of the filler block 30, and between which and said block are interposed groups of antifriction rollers 38 and 38a respectively. As further shown, the rises 37 and 37a terminate in end stops 39 and 39a which will be again referred to hereinafter. The swivel head 35 also has a pendent central boss 40 which fits into the socket 41 of a bearing plate 42 riveted fast to the top web of the truck bolster B; said head and said plate being provided with central apertures 43 and 44 in registry with the central aperture 28 in the top of said bolster. As shown in Fig. 5 the aperture 43 in the swivel head 35 flares upwardly as at 43a; while from Fig. 6 it will be noted that the arcuate rib 34 of the filler block 30 engages the transverse slot 45 between the arcuate rises 37, 37a of said head, and from Fig. 5 that the component 23 of the center pin P extends down through the aligned apertures 43, 44 and 28 to meet the component 22 in the knuckle joint 25. A key 46 transversely engaged in the protruding bottom end of the center pin P beneath a washer 47 serves to hold the filler block 30 to the swivel head 35. For the purposes of controlling the stabilizing mechanism we have shown a pendulum 50 which is pivoted at 51 at any convenient location within, or on the car body, for example, on a cross wall of said body as suggested in Fig. 1, and which is restrained against spasmodic movements by a dash pot 52. At a short distance below the fulcrum 51 the arm of the pendulum 50 has a cross bar 53 which is normally positioned centrally between the ends of the slidable actuating stems 55, 56 and 57, 58 respectively of opposingly-arranged pairs of valves 59, 60 and 61, 62. Through pipes 63 and 64 the valves 59, 60 are connected respectively to opposite ends of a double-acting cylinder 65 bolted or otherwise rigidly secured to the center sill S of the car in the interval between its two side channels. The valves 61 and 62 are similarly connected to the opposite ends of the cylinder 65, through pipes 67 and 68. The valves 59 and 60 are in communication with a suitable source (not shown) of pressure fluid by way of pipes 70 and 71, while pipes 72 and 73 serve to conduct the exhaust from the valves 61 and 62 to any convenient point of disposal. The rod 75 to which the piston 76 of the cylinder 65 is secured extends outwardly through one of the end heads of said cylinder and is integrally formed with, or has secured to it, a toothed rack 77 which meshes with a spur pinion 78 affixed to the transverse eccentric carrying shaft 10 centrally of the latter, said rack bar being confined to longitudinal movement by a guide 79 on a cross member 80 which extends from one side channel of the center sill S to the other.

The operation of the mechanism is as follows:

Let it be assumed that, in Fig. 1, the car has just entered a curved track section having its center of curvature at a point to the right of the illustration, and that by attendant centrifugal action, the pendulum 50 is caused to assume the angular position indicated by the dash-and-dot line x—x. As a consequence of this drift of the pendulum, the valves 59 and 61 will be simultaneously opened whereby pressure fluid will be admitted via pipe 63 to the left-hand end of the cylinder 65 and cause the piston 76 to be moved to the right, while exhausting of the right-hand end of said cylinder will be allowed to take place via the pipe 67, the open valve 61 and the pipe 72. The outward movement thus imparted to the rack 77 will, through the pinion 78, cause the shaft 10 to be turned in the direction of the curved arrow thereon in Fig. 2, with attendant rolling of the sleeves 17 and 17a of the eccentrics 16 and 16a on the cushioned arcuate plates 19 and 19a atop the truck bolster B. Since the eccentrics 16 and 16a are set at one hundred eighty degrees from each other on the shaft 10, it follows, in Fig. 1, that the car body C will be tilted until its vertical center line is parallel to the line x—x, whereupon further movement will cease, and will be so held as long as the pendulum 50 remains in its new position. In responding to the action just described, the block 30 rolls on the curved surfaces 37 and 37a of the swivel head 35, while the component 23 of the center pin P swings about its knuckle joint connection 25 with the component 22. The action of course takes place gradually without accompanying shock or jar since spasmodic movement of the pendulum 50 is prevented by the checking influence of the dash pot 52, so that the occupants of the car are left undisturbed and unconscious of any sudden changes in the direction of travel. When used with freight cars, our invention will operate in a like manner to prevent shifting of and possible damage to the lading. The foregoing conditions will obtain until the car re-enters straight track, when the pendulum will under gravity influence resume its normal true vertical position with attendant opening of the valves 60 and 62 for supply of pressure fluid to the right-hand end of the cylinder 65 by way of pipe 64. Concurrently, the left-hand end of said cylinder will be exhausted via pipe 68, and the shaft 10 will be rotated in the reverse direction to cause, through coaction of the eccentrics 16 and 16a with the plates 19 and 19a on the truck bolster B, return of the car body C to its normal true vertical position. This restoration will likewise be gradual and without attendant shock or jar. The angle to which the car body is tilted will obviously be different depending upon the speed of travel of the car on curved track, it being always parallel to the resultant between force exerted by gravity and that exerted by centrifugality. Rounding by the car of track curves in the opposite direction will be attended by reverse operation of the mechanism in a manner which it is believed can be readily understandable without the necessity for separate description. In the event that the car is stopped on a super elevated or banked curve, the pendulum 50 will be subject to gravity alone and accordingly caused to take a true upright position, when the car body will be turned by automatic operation of the mechanism as before until it assumes a true upright position in parallelism with the pendulum.

In the alternative embodiment of our invention illustrated in Figs. 9–11 we employ a reversible electric motor 85 for actuating the eccentric carrying shaft 10, said motor being of a type having an extended housing portion 85a which encloses speed-reduction gearing and magnetic brake means (not illustrated) of standard construction. To the output shaft 86 of the motor 85 is secured a worm 87 which meshes with a worm wheel 88 affixed to the shaft 10. As in the first embodiment, a pendulum 50 is here utilized as the controlling element, and a dash pot 52 for preventing spasmodic movements thereof. As shown, the pendulum 50 is fulcrumed on a hollow stud 89 bolted to a supporting panel 90 which may be mounted on a transverse wall or partition of the car body. Connected to the pendulum 50 in concentric relation to its fulcrum is a rotary switch disk 91 of insulation to the outer face of which to opposite of its vertical center are secured pairs of spaced metallic concentric contact segments 92 and 93. As shown in Fig. 11 the segments 92 and 93 are respectively connected through conductors 94 and 95 with the terminals of horizontally-aligned solenoid coils 96 and 97 mounted on the panel 90 to one side of the pendulum 50. Secured to the outer end of the stud 89 is an upstanding arm 98 of insulation which supports a pair of contacts 99 and 100. As shown these contacts 99 and 100 are spaced to correspond to the radial spacing of the segments 92 and 93, and, through conductors 101 and 102 (Fig. 11), are connected to a current supply line 103, 104. The solenoids 96 and 97 have a common armature 105 pivotally connected at the center by a screw 106 to the lower end of a lever 107 which intermediate its length, is fulcrumed at 108 on the panel 90. The lever 107 is normally maintained in neutral vertical position by compression springs 109 engaging it from opposite sides. At its upper end the lever 107 is pivotally connected at 110 to the bridge bar 111 of a double throw reversing switch 112 for the motor 85, said bar being of insulation and having heads at its opposite ends in the outer faces of which contact plates 113, 114 and 115, 116 are embedded. As shown, these plates 113, 114, 115 and 116 are respectively adapted to bridge paired point contacts 117, 118, 119 and 120 mounted on insulate angle pieces 121, 122, 123 and 124 on the panel 90, and variously connected after common practice by suitable wiring as shown in Fig. 11 with the armature A and the field coil F of the motor 85 and to the power line 103, 104.

Upon movement of the pendulum 50 to the left, for example, the segments 92 will be brought into contact with the contacts 99 and 100 with attendant energization of the solenoid coil 96. As a consequence, the armature 105 will be drawn to the right and the reversing switch actuated to cause rotation of the motor 85 in one direction. The motor 85 will continue in operation with attendant tilting of the car body until its vertical center is parallel with the pendulum, when current to the motor will be automatically interrupted. Overrunning of the motor is prevented by the associated magnetic brake which becomes operative upon shutting off of the current supply to said motor in a well known manner. Movement of the pendu'um 50 to the right will be attended by engagement of the segments 93 with the contacts 99, 100 and energization of the solenoid 97, with consequent shifting of the armature 105 to the left and movement of the reversing switch 112 in the opposite direction from that in which it was previously moved, to cause reverse rotation of the motor 85 and in turn tilting of the car body correspondingly. The performance of the alternative embodiment of our invention is thus identical with that of the first described embodiment and productive of like results. If desired, other types of reversible motors may be employed in lieu of the series motor herein specifically shown and described if this should be found more convenient or desirable in practice.

While for the purpose of exemplification herein we have disclosed our invention in connection with a railway car, it is not to be considered as limited to such use, since by suitable modifications within the scope of the appended claims, it can be adapted for use with other types of wheeled vehicles.

Having thus described our invention, we claim:

1. Stabilizing mechanism for a rail and other wheeled vehicle whereof the body is capable of lateral tilting relative to a supporting truck, said mechanism including a transverse shaft mounted in the underframing of the vehicle body; cam means at opposite ends of the shaft set at an angle to each other adapted to react with the truck to tilt the body in opposite directions from a normal vertical position depending on the direction of shaft rotation; reversible power means for actuating the shaft; and control means including an element responsive to centrifugal action incident to travel of the vehicle on curves, for controlling the operation of the power means so that the shaft is rotated in the proper direction and to the proper extent to tilt the vehicle body to an angle corresponding to the drift of said element.

2. The invention according to claim 1, wherein the means at the opposite ends of the transverse shaft are respectively in the form of eccentrics set at one hundred eighty degrees relative to each other; wherein the truck is provided with a bolster; and wherein the eccentrics roll on wear plates adjacent the opposite ends of the bolster.

3. In a vehicle having a body and a supporting truck, pivot means connecting the body and the truck to allow lateral tilting of the body and swivelling of the truck, said pivot means comprising a swivel member on the body in engagement with a socket on the truck; an opposing member attached to the body and having complementally curved concave surfaces with interposition between them and arcuate surfaces on the swivel member of anti-friction rollers; and a center pin with a component pendent from said opposing member and passing down through a flared aperture in the swivel member, and a component whereto the first mentioned component is pivoted at a point from which the aforesaid arcuate surfaces are struck, the last mentioned component of the center pin being confined in bearing means on the truck.

4. In a vehicle having a body and a supporting truck, pivot means connecting the body and the truck to allow lateral tilting of the body and swivelling of the truck, said pivot means comprising a swivel member on the body in engagement with a socket on the truck; an opposing member attached to the body and having complementally curved concave surfaces with interposition between them and arcuate surfaces on the swivel member of anti-friction rollers; and a center pin with a component pendent from said opposing member and passing down through a flared aperture in the swivel member, and a component whereto the first mentioned component is pivoted at a point from which the aforesaid arcuate surfaces are struck, the last mentioned component of the center pin being confined in bearing means on the truck; and a pendent transverse tongue projection on the member attached to the body in engagement with a transverse slot in the swivel member.

5. In a vehicle having a body and a supporting truck, pivot means connecting the body and the truck to allow lateral tilting of the body and swivelling of the truck, said pivot means comprising a swivel member on the body in engagement with a socket on the truck; an opposing member attached to the body and having complementally curved concave surfaces with interposition between them and arcuate surfaces on the swivel member of anti-friction rollers; and a center pin with a component pendent from said opposing member and passing down through a flared aperture in the swivel member, and a component whereto the first mentioned component is pivoted at a point from which the aforesaid arcuate surfaces are struck, the last mentioned component of the center pin being confined in bearing means on the truck; and a pendent transverse tongue centrally of the arcuate surface of the member attached to the body in engagement with a transverse slot centrally of the arcuate surface of the swivel member.

6. In a vehicle having a body and a supporting truck, pivot means connecting the body and the truck to allow lateral tilting of the body and swivelling of the truck, said pivot means comprising a swivel member on the body in engagement with a socket on the truck; an opposing member attached to the body and having complementally curved concave surfaces with interposition between them and arcuate surfaces on the swivel member of anti-friction rollers; and a center pin with a component pendent from said opposing member and passing down through a flared aperture in the swivel member, and a component whereto the first mentioned component is pivoted at a point from which the aforesaid arcuate surfaces are struck, the last mentioned component of the center pin being confined in bearing means on the truck; and stops fined in the swivel member adapted, by cooperation on the member attached to the body, to limit lateral tilting of the body in opposite directions.

7. Stabilizing mechanism for a rail or other vehicle with a body capable of lateral tilting relative to a supporting truck, said mechanism comprising a shaft; means actuated by the shaft for tilting the body in opposite directions from a normal vertical position depending upon the direction of shaft rotation; reversible power means including a double-acting pressure fluid cylinder on the vehicle body, and a gear connection between the piston rod of the cylinder and the shaft; and control means including a pendulum fulcrumed on the vehicle body, normally closed valves arranged at opposite sides of the pendulum with slidable actuating stems in the path of the pendulum, and piping connecting said valves respectively with opposite ends of the double-acting cylinder, whereby, incident to drift of the pendulum in one direction or another the corresponding individual valves are opened to admit pressure fluid to one or the other end of the cylinder for actuation of the shaft through the gearing.

8. Stabilizing mechanism for a rail or other vehicle with a body capable of lateral tilting relative to a supporting truck, said mechanism comprising a transverse shaft; cam means at opposite ends of the shaft adapted to react with the truck to tilt the body in opposite directions from a normal vertical position depending on the direction of shaft rotation; power means including a reversible electric motor on the car body and gear connections between said motor and the shaft; and control means including a pendulum fulcrumed on the car body and a normally open double-throw reversing switch moved in one direction or the other depending on the direction of drift of the pendulum to correspondingly permit flow of electric current to the motor in one direction or the other as required.

9. Stabilizing mechanism for a rail or other vehicle with a body capable of lateral tilting relative to the supporting truck, said mechanism comprising a transverse shaft; cam means at opposite ends of the shaft adapted to react with the truck to tilt the body in opposite directions from a normal vertical position depending upon the direction of shaft rotation; power means including a reversible electric motor on the vehicle body, and gear connections between said motor and the shaft; and control means including a pendulum fulcrumed on the car body, a normally open double-throw reversing switch having an actuating lever, magnet coils fixedly mounted adjacent the lever and having a common armature connected to said lever, and rotary switch means operative upon drift of the pendulum in one direction or the other to close circuits through the respective magnet coils to cause the reversing switch to be correspondingly thrown and so control the directional rotation of the motor.

CARLETON K. STEINS.
WILLIAM M. KELLER.

REFERENCES CITED

The following references are of record in the file of this patent:

UNITED STATES PATENTS

| Number | Name | Date |
|---|---|---|
| 894,933 | Benson | Aug. 4, 1908 |
| 2,324,587 | Krogh | July 20, 1943 |
| 2,095,677 | Schoepf et al. | Oct. 12, 1937 |
| 2,174,997 | Ronk | Oct. 3, 1939 |
| 2,088,487 | Schoepf et al. | July 27, 1937 |